(12) United States Patent
Ding et al.

(10) Patent No.: US 11,668,831 B2
(45) Date of Patent: Jun. 6, 2023

(54) HIGH-PRECISION MAPPING METHOD AND DEVICE

(71) Applicant: Beijing Baidu Netcom Science Technology Co., Ltd., Beijing (CN)

(72) Inventors: Wendong Ding, Beijing (CN); Fan Yi, Beijing (CN); Li Yu, Beijing (CN); Pengfei Yuan, Beijing (CN); Shiyu Song, Sunnyvale, CA (US)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 93 days.

(21) Appl. No.: 17/137,470

(22) Filed: Dec. 30, 2020

(65) Prior Publication Data
US 2021/0405200 A1 Dec. 30, 2021

(30) Foreign Application Priority Data
Jun. 28, 2020 (CN) .......................... 202010598678.X (51) Int. Cl.
*G06K 9/00* (2022.01)
*G01S 17/894* (2020.01)
(Continued)

(52) U.S. Cl.
CPC ............ *G01S 17/894* (2020.01); *G01S 17/06* (2013.01); *G06T 7/521* (2017.01); *G06T 7/70* (2017.01);
(Continued)

(58) Field of Classification Search
CPC ....... G01S 17/894; G01S 17/06; G06T 7/521; G06T 7/70; G06T 2207/10028; G06T 2207/30252; G06V 20/647
See application file for complete search history.

(56) References Cited

U.S. PATENT DOCUMENTS 9,025,861 B2 * 5/2015 Furukawa ............... G06T 17/00
382/281
2010/0114416 A1 5/2010 Au et al.
(Continued)

FOREIGN PATENT DOCUMENTS

CN 110046661 A * 7/2019
CN 111340860 A * 6/2020 ............... G06T 7/30
(Continued)

OTHER PUBLICATIONS

Real-time point cloud alignment for vehicle localization in a high resolution 3D map, Balazs Nagy et al., CVF, 2018, pp. 1-14 (Year: 2018).*
(Continued)

*Primary Examiner* — Jayesh A Patel
(74) *Attorney, Agent, or Firm* — Harness, Dickey & Pierce, P.L.C.

(57) ABSTRACT

The present application discloses a high-precision mapping method and device, which relates to the field of autonomous driving. A specific implementation includes: acquiring global initial poses of multiple point clouds, where the point clouds are point clouds of a location for which a map is to be built and are collected by a lidar using a multi-circle collection mode; dividing the multiple point clouds into multiple spatial submap graphs according to a spatial distribution relationship of the multiple point clouds; optimizing, for each spatial submap graph, global initial poses of point clouds belonging to the spatial submap graph to acquire global poses of the point clouds in each spatial submap graph; and stitching the multiple spatial submap graphs together according to global poses of the point clouds in the multiple spatial submap graphs to acquire a base graph of the map to be built.

18 Claims, 5 Drawing Sheets

(51) Int. Cl.
*G06T 7/521* (2017.01)
*G06T 7/70* (2017.01)
*G06V 40/20* (2022.01)
*G06V 20/64* (2022.01)
*G06V 20/56* (2022.01)
*G01S 17/06* (2006.01)

(52) U.S. Cl.
CPC ............ *G06V 20/56* (2022.01); *G06V 20/647* (2022.01); *G06V 40/23* (2022.01); *G06T 2207/10028* (2013.01); *G06T 2207/30252* (2013.01)

(56) References Cited

U.S. PATENT DOCUMENTS

| | | | | |
|---|---|---|---|---|
| 2018/0188043 | A1* | 7/2018 | Chen | G01C 11/12 |
| 2018/0330475 | A1* | 11/2018 | Tokatyan | G06K 9/6267 |
| 2019/0015566 | A1* | 1/2019 | Salehi | A61M 1/7411 |
| 2019/0323843 | A1* | 10/2019 | Yu | G06T 7/73 |
| 2019/0371044 | A1* | 12/2019 | Yu | G06T 17/00 |

FOREIGN PATENT DOCUMENTS

| | | | | |
|---|---|---|---|---|
| EP | 3506212 A1 * | 7/2019 | ............... | B66D 5/14 |
| JP | 2017138219 A | 8/2017 | | |
| JP | 2019211466 A | 12/2019 | | |
| KR | 20180059723 A | 6/2018 | | |
| KR | 20190001668 A | 1/2019 | | |
| WO | 2018133851 A1 | 7/2018 | | |
| WO | 2019/204800 A1 | 10/2019 | | |
| WO | WO-2019204800 A1 * | 10/2019 | ......... | G01C 21/1652 |
| WO | WO-2020043041 A1 * | 3/2020 | ......... | G06K 9/00201 |
| WO | WO-2020154966 A1 * | 8/2020 | ............. | G01S 17/42 |

OTHER PUBLICATIONS

Extended European Search Report for corresponding European patent application No. 21164805.0 dated Jan. 19, 2022, 10 pages.
Office Action from corresponding Japanese Application No. 2021065423 dated May 30, 2022. (8 pages).
Office Action in corresponding Korean Patent Application No. 10-2021-0042826 dated Sep. 15, 2022.
Written Decision on Registration in corresponding Korean Patent Application No. 10-2021-0042826 dated Mar. 23, 2023.

* cited by examiner

FIG. 8

HIGH-PRECISION MAPPING METHOD AND DEVICE

CROSS-REFERENCE TO RELATED APPLICATION

This application claims priority to Chinese Patent Application No. 202010598678.X, filed on Jun. 28, 2020, which is hereby incorporated by reference in its entirety.

TECHNICAL FIELD

The present application relates to the field of autonomous driving, in particular, to high-precision map technologies, and discloses a high-precision mapping method and device.

BACKGROUND

A high-precision map is an important part of autonomous driving. The high-precision map in combination with real-time positioning technologies for an unmanned vehicle provides basic technical support for autonomous driving of the unmanned vehicle, such as scenario perception and decision-making. In order to accomplish large-scale high-precision mapping, it is very important to improve mapping efficiency of the high-precision map.

In the prior art, the high-precision map generally contains different layers, where a bottom layer of the map is usually configured to model actual three-dimensional environment. In order to obtain the bottom layer of the high-precision map, a lidar (LiDAR) is usually used to collect point cloud data, and the point cloud data is uploaded, solved, and performed with initial value estimation and optimization iteration to generate the bottom layer of the high-precision map. Subsequently, the bottom layer and other layers of the high-precision map are stitched together to generate a high-precision map.

However, during generation of a base graph of the high-precision map, the prior art is heavily dependent on initial values of point clouds during the initial value estimation, which in turn leads to poor scenario adaptability in a weak global positioning system (GPS) such that there is a heavy computation burden in an optimization process and mapping optimization cannot be accomplished quickly.

SUMMARY

Provided are a mapping method and device for solving the problem in the prior art that the mapping optimization cannot be accomplished quickly.

According to a first aspect, a high-precision mapping method is provided, including:

acquiring global initial poses of multiple point clouds, where the point clouds are point clouds of a location for which a map is to be built and are collected by a lidar using a multi-circle collection mode;

dividing the multiple point clouds into multiple spatial submap graphs according to a spatial distribution relationship of the multiple point clouds;

optimizing, for each spatial submap graph, global initial poses of point clouds belonging to the spatial submap graph to acquire global poses of the point clouds in each spatial submap graph; and stitching the multiple spatial submap graphs together according to global poses of the point clouds in each spatial submap graph to acquire a base graph of the map to be built.

According to a second aspect, a high-precision mapping device, including:

an acquiring module, configured to acquire global initial poses of multiple point clouds, where the point clouds are point clouds of a location for which a map is to be built and are collected by a lidar using a multi-circle collection mode;

an optimizing module, configured to divide the multiple point clouds into multiple spatial submap graphs according to a spatial distribution relationship of the multiple point clouds, and optimize, for each spatial submap graph, global initial poses of point clouds belonging to the spatial submap graph to acquire global poses of the point clouds in each spatial submap graph; and a stitching module, configured to stitch the multiple spatial submap graphs together according to global poses of the point clouds in each spatial submap graph to acquire a base graph of the map to be built.

According to a third aspect, an electronic device is provided, including:

at least one processor; and a memory in communication with the at least one processor, where the memory is stored with instructions executable by the at least one processor, and the instructions are executed by the at least one processor to enable the at least one processor to implement the method described in the first aspect.

According to a third aspect, a non-transient computer readable storage medium stored with computer instructions is provided, where the computer instructions are configured to enable the computer to implement the method described above in the first aspect.

According to the technology of the present application, the technical problem in the prior art that mapping optimization cannot be accomplished quickly is solved. Compared with the prior art, in the present application, multiple frames of point clouds are divided into multiple spatial submap graphs and, for each spatial submap graph, global initial poses of point clouds belonging to the spatial submap graph are optimized so that the amount of computations in the optimization process is reduced, stitching efficiency of the point clouds can be improved, and mapping optimization is accomplished quickly.

It should be understood that contents described in this part are not intended to identify key or important features in embodiments of the present disclosure, nor to limit the scope of the present disclosure. Other features of the present disclosure will become readily comprehensible with the following description.

BRIEF DESCRIPTION OF DRAWING(S)

The accompanying drawings are used for a better understanding of the scheme of the present application, which do not constitute a limitation of the present application. Among them.

DESCRIPTION OF EMBODIMENTS

Exemplary embodiments of the present application will be described hereunder with reference to the accompanying drawings, which include various details of the embodiments of the present application to facilitate understanding and should be considered as merely exemplary. Therefore, those of ordinary skill in the art should realize that various changes and modifications can be made to the embodiments described herein without departing from the scope and spirit of the present application. Also, for clarity and conciseness, descriptions of well-known functions and structures are omitted in the following description.

A high-precision map is an important part of autonomous driving. The high-precision map in combination with real-time positioning technologies for an unmanned vehicle provide scenario perception, decision-making and other basic technical support for autonomous driving of the unmanned vehicle. In order to accomplish large-scale high-precision mapping, it is very important to improve mapping efficiency of the high-precision map.

In the prior art, the high-precision map generally contains different layers, where a bottom layer of the map is usually configured to model actual three-dimensional environment. In order to obtain the bottom layer of the high-precision map, a lidar (LiDAR) is usually configured to collect point cloud data, and the point cloud data is uploaded, solved, and performed with initial value estimation and optimization iteration to generate the bottom layer of the high-precision map. Subsequently, the bottom layer and other layers of the high-precision map are stitched together to generate a high-precision map.

However, during generation of a base graph of the high-precision map, the prior art is heavily dependent on initial values of point clouds during the initial value estimation, which in turn leads to poor scenario adaptability in a weak global positioning system (GPS) such that there is a heavy computation burden in an optimization process and mapping optimization cannot be accomplished quickly.

In light of the above problem, the embodiments of the present application provide a high-precision mapping method and device for solving the technical problem in the prior art that mapping optimization cannot be accomplished quickly. Technical conception of the present application lies in: dividing multiple frames of point clouds collected by a lidar using a multi-circle collection mode into multiple spatial submap graphs for respective global initial pose optimizations, and then stitching the spatial submap graphs together to acquire a base graph of a map to be built. Compared with the prior art, according to the mapping method provided in the present application, the amount of computations in the optimization process is reduced, thus stitching efficiency of the point clouds can be improved, and mapping optimization is accomplished quickly.

In order to clearly understand technical solutions in the present application, terms involved in the present application are explained as follows:

Point cloud: referring to scan data recorded in a form of points, where each point contains a three-dimensional coordinate, and may also contain color information, reflection intensity information, and others. Among them, the color information is usually determined by the collection device acquiring image and giving color information on pixel points of a corresponding position to corresponding points in point clouds; the reflection intensity information is acquired from echo intensity collected by a lidar receiver, and such intensity information is in connection with a surface material, roughness and direction of incident angle of a target, emission energy of an instrument, and a laser wavelength.

Pose: referring to a position and a pose of a point cloud in a specified coordinate system.

Spatial submap graph: including point cloud data of a certain region according to positional distribution of point clouds, where different spatial submap graphs can be aggregated together to form a base graph of a map to be built.

Temporal submap graph: point cloud data obtained from data updating for a latest frame of point clouds that are constantly added according to a time sequence.

Description will be made hereunder with regard to an application scenario of the present application.

Figure 1:
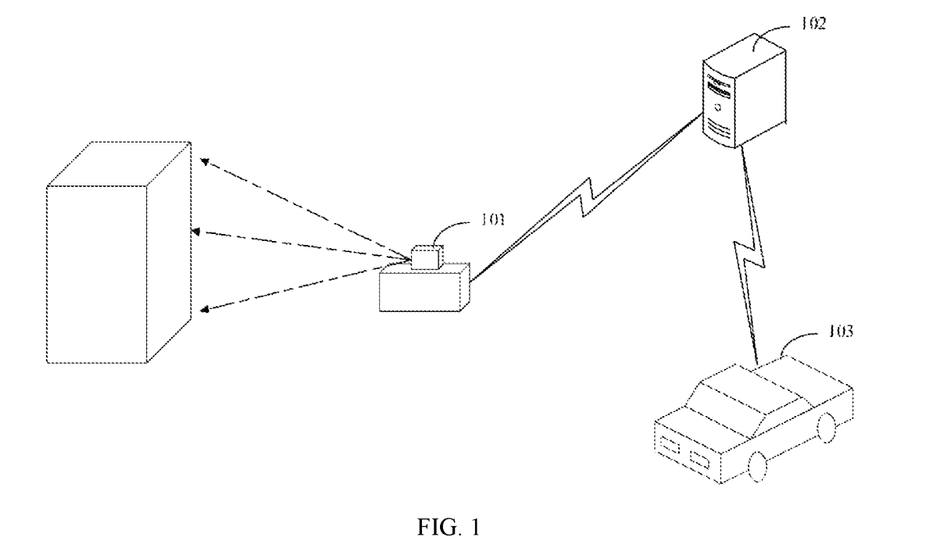
FIG. 1 is a schematic diagram illustrating a scenario of a high-precision mapping method according to an embodiment of the present application.

FIG. 1 is a schematic diagram illustrating a scenario of a high-precision mapping method according to an embodiment of the present application. As shown in FIG. 1, when drawing a high-precision map, a lidar 101 uses a multi-circle collection mode to collect point clouds of a location for which a map is to be built. Then, the lidar 101 transmits information on the point clouds to an electronic device 102 which processes the point clouds to generate a base graph of the map to be built, and then stitch the base graph with other layers of the map to be built to form a high-precision map. During autonomous driving, a vehicle 103 may acquire the high-precision map in the electronic device 102 so as to plan, according to the high-precision map, a route for the autonomous driving.

The lidar 101 is a kind of radar which may detect a position, a speed and other characteristics of a target with an emitted laser beam. The lidar 101 may or may not be provided on the vehicle 103.

The electronic device 102 may be a terminal device or a server. The terminal device may be, but is not limited to, a user device such as a computer, a mobile phone, a message transceiving device, a tablet device, and a personal digital assistant. The server may be, but is not limited to, a single network server, a server group composed of multiple network servers, or a cloud-computing-based cloud composed of a large number of computers or network servers. Among them, the cloud computing is a kind of distributed computing, a virtual super computer composed of a group of loosely coupled computers.

It should be noted that the application scenario provided in the embodiments of the present application includes, but is not limited to, an autonomous driving scenario, and can also be applied to any other scenario requiring the high-precision map.

An executive subject of the high-precision mapping method provided in the embodiments of the present application may be a high-precision mapping device. The high-precision mapping device may be implemented by means of software and/or hardware, where the hardware may be, for example, the electronic device described above or a chip in the electronic device, while the software may be, for example, a computer program command, an application program or the like.

Using a server integrated or installed with relevant execution codes as an example, the technical solutions in the embodiments of the present application will be described hereunder in detail with specific embodiments. The following specific embodiments can be combined with each other. For the sake of redundancy, the same or similar concepts or processes may not be described again in some embodiments.

Figure 2:
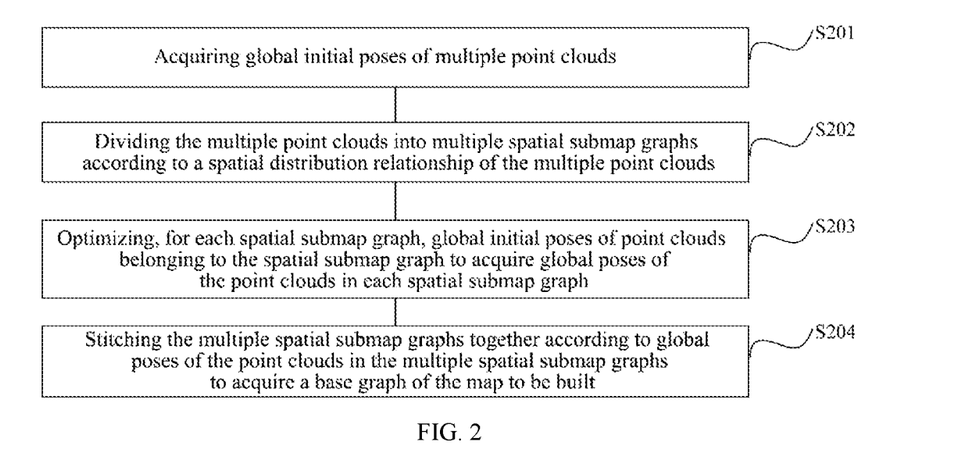
FIG. 2 is a flow diagram of a high-precision mapping method according to an embodiment of the present application.

FIG. 2 is a flow diagram of a high-precision mapping method according to an embodiment of the present application. The present embodiment relates to a process with regard to how to perform high-precision mapping. As shown in FIG. 2, the method includes:

S201, acquiring global initial poses of multiple point clouds, where the point clouds are point clouds of a location for which a map is to be built and are collected by a lidar using a multi-circle collection mode.

The multi-circle collection mode may be comprehended as dividing the location for which the map is to be built into multiple collection circles, and collecting the point clouds circle by circle with the lidar.

The embodiment of the present application does not limit how to acquire global initial poses of multiple point clouds. In some embodiments, in a region with good global positioning system (GPS) signals, the server may receive GPS data and/or Inertial Measurement Unit (IMU) data directly, and acquire the global initial poses of the multiple point clouds from the GPS data and/or the IMU data.

In some embodiments, when the point clouds are collected indoors or blocked, the GPS signals are weak, at this point, firstly, the server may acquire a relative pose between two temporally adjacent point clouds by receiving wheel speed meter data and IMU data transmitted by a wheel speed meter and an IMU. Secondly, the sever may acquire at least one temporal submap graph, where each temporal submap graph includes temporally adjacent point clouds. Thirdly, the server may generate a first pose graph according to global positioning system GPS data, the relative pose between the two temporally adjacent point clouds, and the at least one temporal submap graph, where each point cloud is characterized as a node in the first pose graph, and the two adjacent point clouds are characterized as adjacent nodes in the first pose graph. Finally, the server may optimize the first pose graph to acquire the global initial poses of the multiple point clouds.

The temporal submap graph specifically includes occupancy grid data and reflection value grid data with multi-resolution. Grid data is composed of multiple cells in a row and column arrangement. Exemplarily, for an occupancy grid, a cell corresponding to one grid only has two states: occupied and unoccupied. If an obstacle is scanned by the lidar at a corresponding position of one grid, the cell is then in an occupied state; if an obstacle is not scanned by the lidar at a corresponding position of one grid, the cell is then in an unoccupied state. Exemplarily, for a reflection value grid, a cell corresponding to each grid includes a reflection value of a radar signal.

The first pose graph will be described hereunder. Exemplarily, in the first pose graph generated from graph optimization, each temporal submap graph is provided with a node accordingly, and each point cloud in the temporal submap graph is also provided with a node accordingly. An internal edge of the submap graph is between the node of the temporal submap graph and the node of the point cloud in the temporal submap graph, and an edge for adjacent nodes is between nodes of two adjacent point clouds. Among them, the edge at the submap graph node can be formed through a uni-circle constraint or a multi-circle constraint. The uni-circle and the multi-circle refer to the number of circles scanned by the lidar. The edge for adjacent nodes can be formed from the relative pose between the two adjacent point clouds.

S202, dividing the multiple point clouds into multiple spatial submap graphs according to a spatial distribution relationship of the multiple point clouds.

The spatial distribution relationship of the multiple point clouds may be a spatial relationship in an altitude direction and a spatial relationship in a horizontal direction. Specifically, the server may divide the point clouds into multiple spatial submap graphs according to a spatial distribution relationship of the point clouds in an altitude direction and a spatial distribution relationship of the point clouds in a horizontal direction.

The embodiment of the present application may use one spatial distribution relationship to divide the multiple point clouds into multiple spatial submap graphs, or may use more spatial distribution relationships to divide the multiple point clouds into multiple spatial submap graphs, the present application is not limited thereto.

In some embodiments, the server divides, in the altitude direction, point clouds located on an identical layer into an identical spatial submap graph according to layering of the multiple point clouds in altitude. The server acquires, in the horizontal direction, an undirected graph of the point clouds according to a trajectory formed from the global initial poses of the multiple point clouds. Moreover, the undirected graph may be cut through a minimum cut algorithm to divide the point clouds in the undirected graph into the multiple spatial submap graphs.

Exemplarily, the spatial submap graph is divided by using the spatial relationship in the altitude direction as an example, if the location for which the map is to be built is a multi-layer basement, then in the altitude direction, multiple point clouds distributed in each layer of the basement are divided into an identical spatial submap graph. The spatial submap graph is divided by using trajectory formation in the horizontal direction as an example, in the horizontal direction, the server may acquire, in the horizontal direction, an undirected graph of the point clouds according to a trajectory formed from the global initial poses of the multiple point clouds, and then cut the undirected graph through a minimum cut algorithm, and divide the point clouds in the undirected graph into the multiple spatial submap graphs. In addition, spatial submap graphs cut from the undirected graph through the minimum cut algorithm can also be clustered. If the cut spatial submap graphs are less than a preset threshold value for the spatial submap graphs, they can be incorporated into an adjacent spatial submap graph.

S203, optimizing, for each spatial submap graph, global initial poses of point clouds belonging to the spatial submap graph to acquire global poses of the point clouds in each spatial submap graph.

In an embodiment of the present application, after dividing the multiple point clouds into multiple spatial submap graphs, the server may optimize, for each spatial submap graph, global initial poses of point clouds belonging to the spatial submap graph to acquire global poses of the point clouds in each spatial submap graph. Point clouds in different spatial submap graphs may use different optimization modes or use the same optimization mode.

In some embodiments, prior to the optimizing, the server may determine point clouds in the spatial submap graph that satisfy an error condition, and thus determine an optimization mode for the point clouds in the spatial submap graph according to a circumstance whether a ratio of the point clouds in the spatial submap graph that satisfy the error condition is greater than a threshold.

Exemplarily, for each point cloud, original GPS data in proximity of a corresponding timestamp of the point cloud can be searched, and a GPS state can be used as the error condition. Specifically, if a condition in which the number of GPS satellites is greater than 8 and a position error is less than 0.05 m is satisfied, it may be then deemed that the point cloud meets the error condition. In addition, for the collected data, it cannot be assured that the acquired multiple point clouds are evenly distributed in the location for which the map is to be built, generally, the point clouds are densely distributed in roads such as intersection holding/speed limiting areas, while the point clouds are often sparsely distributed in other places. Therefore, prior to a determination of whether the point clouds meet the error condition, the point clouds may be downsampled according to the spatial distribution thereof in order that the amount of computations is reduced.

In some embodiments, before the global initial poses of the point clouds are optimized using a corresponding optimization mode, it is also possible to form, according to a point cloud distance limit, two point clouds in the spatial submap graph which have a common observation point and for which an absolute value of a difference between global initial poses is less than the distance limit into a point cloud pair, where a weight of the point cloud pair is negatively related to temporal distance between the point clouds contained in the point cloud pair.

In some embodiments, if a ratio of point clouds in the spatial submap graph that satisfy an error condition is greater than a preset ratio threshold, then a small-scale optimization may be used. Specifically, the small-scale optimization may include: discarding a first point cloud pair in the spatial submap graph having a weight less than a first threshold; determining a relative pose of each point cloud in a second point cloud pair other than the first point cloud pair in the spatial submap graph using a generalized iterative closest point algorithm; and finally, fusing, through a pose graph, the relative pose of each point cloud in the second point cloud pair with a global initial pose of each point cloud in the second point cloud pair to acquire a global pose of each point cloud in the second point cloud pair.

In some embodiments, if a ratio of point clouds in the spatial submap graph that satisfy an error condition is less than or equal to a preset ratio threshold, then a large-scale optimization may be used. Specifically, the large-scale optimization includes: acquiring a point pair of each point cloud pair in the spatial submap graph; acquiring a relative pose of each point cloud in each point cloud pair according to the point pair of each point cloud pair in the spatial submap graph and a weight of each point cloud pair; and fusing, through a pose graph, the relative pose of each point cloud in each point cloud pair with a global initial pose of each point cloud in each point cloud pair to acquire a global pose of each point cloud in each point cloud pair.

S204, stitching the multiple spatial submap graphs together according to global poses of the point clouds in each spatial submap graph to acquire a base graph of the map to be built.

In an embodiment of the present application, after optimization of the global initial poses of the point clouds in each spatial submap graph is accomplished, it is possible to stitch the multiple spatial submap graphs together according to global poses of the point clouds in the multiple spatial submap graphs to acquire a base graph of the map to be built.

Embodiments of the present application do not limit how to stitch the spatial submap graph together into a base graph of the map to be built. Exemplarily, the global poses of the point clouds in each spatial submap graph may be used as an edge, and each point cloud in each spatial submap graph may be used as a node to form a pose graph. In this pose graph, part of the point clouds only belongs to one spatial submap graph, compared with global poses of this part of point clouds, point clouds shared by multiple spatial submap graphs will get involved in optimization. Here, for point clouds in proximity of a boundary of the spatial submap graph, a higher weight will be given systematically; and for point clouds far away from a boundary of the spatial submap graph, a lower weight will be given. This optimization process can be indicated as a graph optimization. After the optimization is accomplished, different spatial submap graphs are aggregated to form the base graph of the map to be built.

The mapping method provided in the embodiments of the present application allows for acquiring global initial poses of multiple point clouds, where the point clouds are point clouds of a location for which a map is to be built and are collected by a lidar using a multi-circle collection mode; dividing the multiple point clouds into multiple spatial submap graphs according to a spatial distribution relationship of the multiple point clouds; optimizing, for each spatial submap graph, global initial poses of point clouds belonging to the spatial submap graph to acquire global poses of the point clouds in each spatial submap graph; and stitching the multiple spatial submap graphs together according to global poses of the point clouds in the multiple spatial submap graphs to acquire a base graph of the map to be built. Compared with the prior art, in the present application, multiple point clouds are divided into multiple spatial submap graphs and, for each spatial submap graph, global initial poses of point clouds belonging to the spatial submap graph are optimized so that the amount of computations in the optimization process is reduced, stitching efficiency of the point clouds can be improved, and mapping optimization is accomplished quickly.

Based on the above embodiments, description will be made hereunder with regard to how to acquire global initial poses of multiple point clouds. In some embodiments, if in a location with good GPS signals, such as outdoors, the server may acquire the global initial poses of the multiple point clouds directly from the global positioning system GPS data and/or the Inertial Measurement Unit (IMU) data. If in an indoor location or a location with blocked GPS signals, a LiDAR simultaneous localization and mapping (SLAM) system may be configured to acquire the global initial poses of the multiple point clouds.

Figure 3:
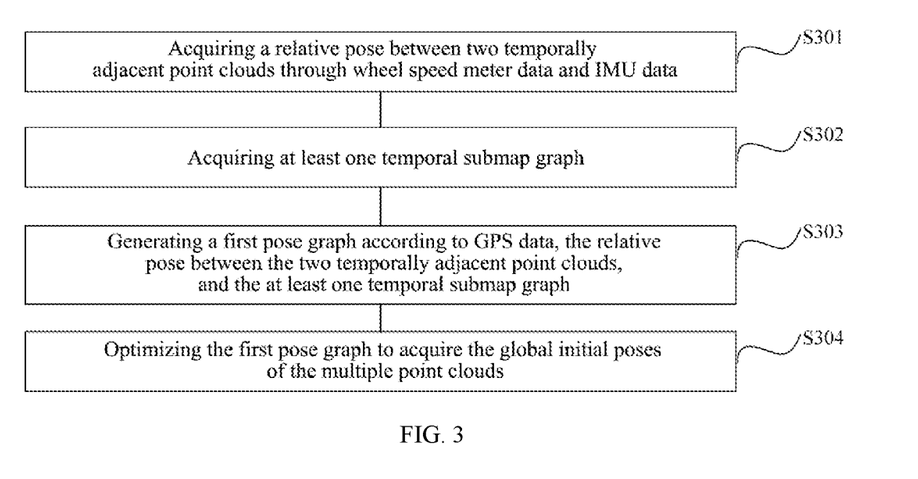
FIG. 3 is another flow diagram of a high-precision mapping method according to an embodiment of the present application.

FIG. 3 is another flow diagram of a high-precision mapping method according to an embodiment of the present application. FIG. 3 shows how to use LiDAR SLAM to acquire the global initial poses of the multiple point clouds. As shown in FIG. 3, the high-precision mapping method includes:

S301, acquiring a relative pose between two temporally adjacent point clouds through wheel speed meter data and inertial measurement unit IMU data.

In this step, the server may receive wheel speed meter data and IMU data, and predict a relative position between two temporally adjacent point clouds based on the wheel speed meter data and the IMU data. For a specific prediction process, it is not limited in the embodiments of the present application, and can be carried out according to an existing prediction method.

S302, acquiring at least one temporal submap graph, where each temporal submap graph includes temporally adjacent point clouds.

In this step, the server may acquire multiple temporal submap graphs after acquiring the relative pose between the two temporally adjacent point clouds.

In some embodiments, the relative pose between the two temporally adjacent point clouds may be used as a priori to match point clouds with multiple temporal submap graphs. After the matching, the matched point clouds may be used to update the temporal submap graphs. When there is no point cloud in a temporal submap graph, the point clouds can be filled in the temporal submap graph.

The temporal submap graph specifically includes occupancy grid data and reflection value grid data with multi-resolution. Grid data is composed of multiple cells in a row and column arrangement. Exemplarily, for an occupancy grid, a cell corresponding to one grid only has two states: occupied and unoccupied. If an obstacle is scanned by the lidar at a corresponding position of one grid, the cell is then in an occupied state; if an obstacle is not scanned by the lidar at a corresponding position of one grid, the cell is then in an unoccupied state. Exemplarily, for a reflection value grid, a cell corresponding to each grid includes a reflection value of a radar signal.

S303, generating a first pose graph according to global positioning system GPS data, the relative pose between the two temporally adjacent point clouds, and the at least one temporal submap graph, where each point cloud is characterized as a node in the first pose graph, and the two adjacent point clouds are characterized as adjacent nodes in the first pose graph.

The first pose graph will be described hereunder. Exemplarily, in the first pose graph generated from graph optimization, each temporal submap graph is provided with a node accordingly, and each point cloud in the temporal submap graph is also provided with a node accordingly. An internal edge of the submap graph is between the node of the temporal submap graph and the node of the point cloud in the temporal submap graph, and an edge for adjacent nodes is between nodes of two adjacent point clouds. Among them, the edge at the submap graph node can be formed through a uni-circle constraint or a multi-circle constraint. The uni-circle and the multi-circle refer to the number of circles scanned by the lidar. The edge for adjacent nodes can be formed from the relative pose between the two adjacent point clouds.

In some embodiments, the multi-circle constraint and the uni-circle constraint of the temporal submap graph are related to point cloud search distance used in closed-loop detection on point clouds. Specifically, since the point clouds will have accumulative drift during matching with multiple temporal submap graphs, the point clouds may then be performed with the closed-loop detection to effectively reduce the accumulative drift. Closed-loop detection results generally have consistency, that is, when there are multiple point cloud search distances that can match the closed-loop detection, the closed-loop detection results can be checked with this characteristic.

In the present application, since both the matching of the point clouds with the temporal submap graph and the closed-loop detection of the point clouds are in a local coordinate system, while the mapping system ultimately needs to get a global pose, it is necessary to convert trajectory of the point clouds to a global coordinate system through GPS data, and use a pose graph to fuse the above data. During generation of the pose graph, a relative pose constraint between two temporally adjacent point clouds constitute an edge for adjacent nodes of a first pose graph, and the multi-circle constraint and the uni-circle constraint of the temporal submap graph constitute an edge at a submap graph level of the first pose graph. In addition, in order to fuse the GPS data, a virtual node is constructed with local-global transformation so that point cloud status matches GPS measurement.

S304, optimizing the first pose graph to acquire the global initial poses of the multiple point clouds.

The embodiments of the present application do not limit how to optimize the first pose graph to acquire the global initial poses of the multiple point clouds, which can be performed according to an existing pose graph optimization mode.

The high-precision mapping method provided in the embodiments of the present application allows for: firstly, acquiring a relative pose between two temporally adjacent point clouds through wheel speed meter data and IMU data; then acquiring multiple temporal submap graph; then generating a first pose graph according to global positioning system GPS data, the relative pose between the two temporally adjacent point clouds, and the multiple temporal submap graphs; and finally optimizing the first pose graph to acquire the global initial poses of the multiple point clouds. This method can reduce dependence on global initial pose quality in a mapping process, and has better applicability for a weak GPS scenario.

Figure 4:
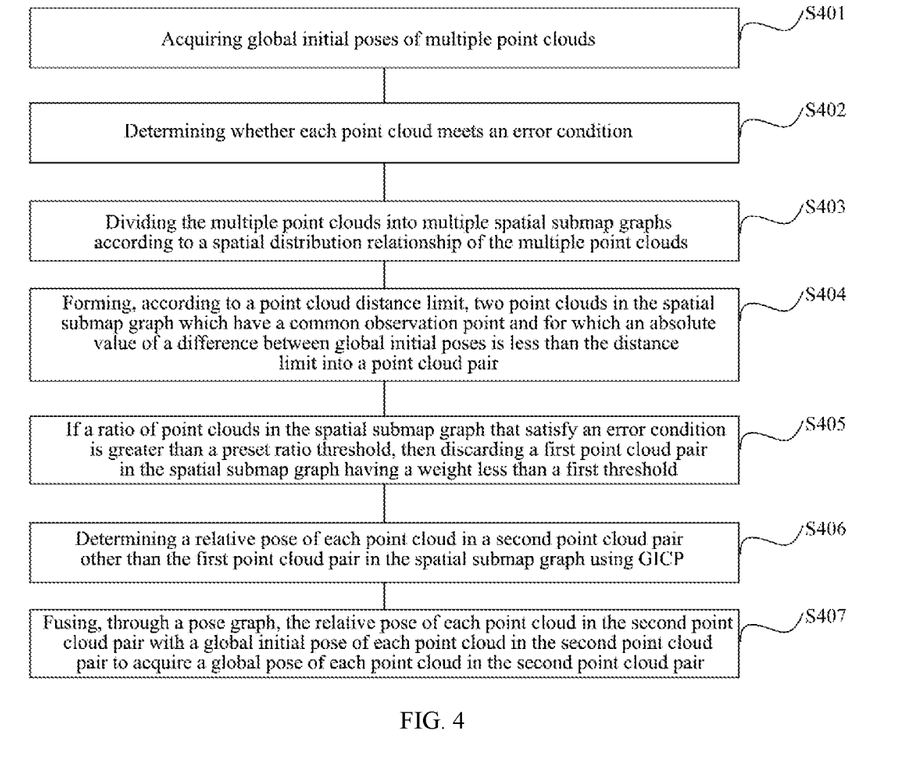
FIG. 4 is yet another flow diagram of a high-precision mapping method according to an embodiment of the present application.

Based on the above embodiments, the following provides a small-scale optimization method to optimize global initial poses of point clouds belonging to an identical spatial submap graph. FIG. 4 is yet another flow diagram of a high-precision mapping method according to an embodiment of the present application. As shown in FIG. 4, the high-precision mapping method includes:

S401, acquiring global initial poses of multiple point clouds, where the point clouds are point clouds of a location for which a map is to be built and are collected by a lidar using a multi-circle collection mode.

For technical effects, technical features and optional embodiments of S401, reference may be made to contents of S201 shown in FIG. 2, and details will not be described here again.

S402, determining whether each point cloud meets an error condition.

The error condition includes that the number of GPS satellites corresponding to timestamps of the point clouds exceeds a second threshold and a point cloud position error is less than a third threshold.

The second threshold and the third threshold are not limited in the embodiments of the present application, and can be set according to an actual situation.

Exemplarily, for each point cloud, original GPS data in proximity of a corresponding timestamp of the point cloud can be searched, and a GPS state can be used as the error condition. Specifically, if a condition in which the number of GPS satellites is greater than 8 and a position error of the point cloud is less than 0.05 m is satisfied, it may be then deemed that the point cloud meets the error condition. In addition, for the collected data, it cannot be assured that the acquired multiple point clouds are evenly distributed in the location for which the map is to be built, generally, the point clouds are densely distributed in roads such as intersection holding/speed limiting areas, while the point clouds are often sparsely distributed in other places. Therefore, prior to a determination of whether the point clouds meet the error condition, the point clouds may be downsampled according to the spatial distribution thereof in order that errors are reduced.

S403, dividing the multiple point clouds into multiple spatial submap graphs according to a spatial distribution relationship of the multiple point clouds.

For technical effects, technical features and optional embodiments of S403, reference may be made to contents of S202 shown in FIG. 2, and details will not be described here again.

S404, forming, according to a point cloud distance limit, two point clouds in the spatial submap graph which have a common observation point and for which an absolute value of a difference between global initial poses is less than the distance limit into a point cloud pair, where a weight of the point cloud pair is negatively related to temporal distance between the point clouds contained in the point cloud pair.

The point cloud distance limit is a preset value, and may be adjusted according to stitching quality of the base graph of the map to be built.

Exemplarily, for a down-sampled point cloud i in each spatial submap graph, other point clouds in the spatial submap graph may be traversed, if it is found that distance between an additional point cloud and the point cloud i in the horizontal direction is less than the point cloud distance limit $\theta_2$, then it may be deemed that the two point clouds have a common observation point, and an absolute value of a difference between global initial poses is less than the distance limit, then correspondingly, the two point clouds may be formed into a point cloud pair (frame pair).

In some embodiments, in order to smooth a multi-circle trajectory error so as to avoid ghosting introduced by multiple circles, the point cloud pair may be assigned a different weight. Multi-circle point cloud pairs are spatially close, but temporally farther, so a point cloud pair with temporally near distance has a low weight, and a point cloud pair with temporally far distance has a high weight. The weight of the point cloud pair may be represented by formula (1):

$$w_{ij}^p = \begin{cases} 0.2, & |t_i - t_j| < \sigma \\ 1, & |t_i - t_j| \geq \sigma \end{cases} \quad (1)$$

where $\sigma$ may be generally set to 10.

S405, if a ratio of point clouds in the spatial submap graph that satisfy an error condition is greater than a preset ratio threshold, then discarding a first point cloud pair in the spatial submap graph having a weight less than a first threshold, where the error condition includes that the number of GPS satellites corresponding to timestamps of the point clouds exceeds a second threshold and a point cloud position error is less than a third threshold.

The ratio threshold is not limited in the embodiments of the present application, which may be set according to an actual situation. Exemplarily, it may be set to 0.5, 0.8, or the like.

In some embodiments, in addition to considering the ratio of the point clouds that satisfy the error condition, it is also necessary to consider a ratio of areas of a minimum bounding rectangle of the point clouds that satisfy the error condition to areas of a minimum bounding rectangle of the spatial submap graph.

Exemplarily, an example is taken where both of the above ratio thresholds are 0.8, if, according to statistics, the ratio of the point clouds in each spatial submap graph that satisfy the error condition is greater than 0.8, and the ratio of the areas of the minimum bounding rectangle of the point clouds that satisfy the error condition to the areas of the minimum bounding rectangle of the spatial submap graph is greater than 0.8, then the point clouds in this spatial submap graph may use small-scale optimization.

In the small-scale optimization, if the weight is less than 1, the server then discards this point cloud pair; if the weight is greater than 1, the server then retains this point cloud pair.

S406, determining a relative pose of each point cloud in a second point cloud pair other than the first point cloud pair in the spatial submap graph using a generalized iterative closest point GICP algorithm.

The embodiments of the present application do not limit how to determine a relative pose of a point cloud using a generalized iterative closest point algorithm, which may be carried out using an existing way.

S407, fusing, through a pose graph, the relative pose of each point cloud in the second point cloud pair with a global initial pose of each point cloud in the second point cloud pair to acquire a global pose of each point cloud in the second point cloud pair.

In this step, after the relative pose of each point cloud in the second point cloud pair is determined, a global pose of each point cloud in the second point cloud pair can be acquired by fusing the relative pose of each point cloud in the second point cloud pair with the global initial pose of each point cloud in the second point cloud pair through the pose map.

Exemplarily, after estimation of the relative pose is finished, we use the pose graph to fuse the relative pose of each point cloud and the global initial pose of each point cloud. In the pose graph, the relative pose of each point cloud is a node, a relative constraint constitutes a binary edge, and the global initial pose constitutes a unary edge, thereby acquiring the global pose of each point cloud in the second point cloud pair.

In the present application, the global pose of each output point cloud is smoother after the optimization of the pose graph.

Figure 5:
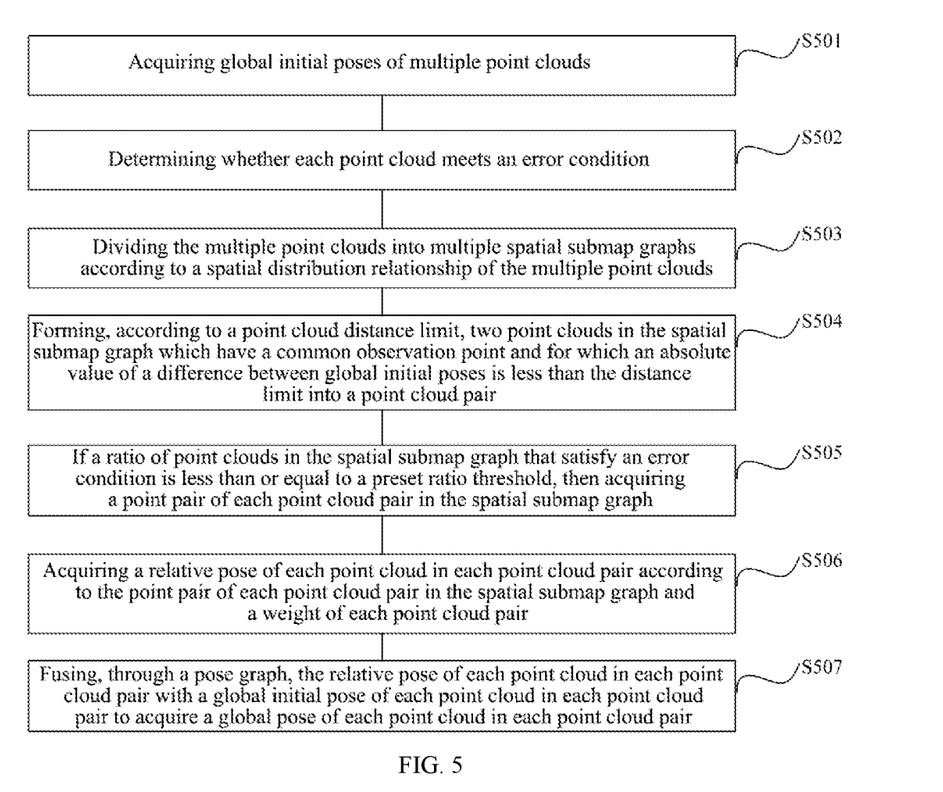
FIG. 5 is yet another flow diagram of a high-precision mapping method according to an embodiment of the present application.

Based the above embodiments, the following provides a large-scale optimization method to optimize global initial poses of point clouds belonging to an identical spatial submap graph. FIG. 5 is yet another flow diagram of a mapping method according to an embodiment of the present application. As shown in FIG. 5, the mapping method includes:

S501, acquiring global initial poses of multiple point clouds, where the point clouds are point clouds of a location for which a map is to be built and are collected by a lidar using a multi-circle collection mode.

S502, determining whether each point cloud meets an error condition.

S503, dividing the multiple point clouds into multiple spatial submap graphs according to a spatial distribution relationship of the multiple point clouds.

S504, forming, according to a point cloud distance limit, two point clouds in the spatial submap graph which have a common observation point and for which an absolute value of a difference between global initial poses is less than the distance limit into a point cloud pair, where a weight of the point cloud pair is negatively related to temporal distance between the point clouds contained in the point cloud pair.

For technical effects, technical features and optional embodiments of S501-S504, reference may be made to contents of S401-S404 shown in FIG. 4, and details will not be described here again.

S505, if a ratio of point clouds in the spatial submap graph that satisfy an error condition is less than or equal to a preset ratio threshold, then acquiring a point pair of each point cloud pair in the spatial submap graph, where the error condition includes that the number of GPS satellites corresponding to timestamps of the point clouds exceeds a second threshold and a point cloud position error is less than a third threshold.

The ratio threshold is not limited in the embodiments of the present application, which may be set according to an actual situation. Exemplarily, it may be set to 0.5, 0.8, or the like.

In some embodiments, in addition to considering the ratio of the point clouds that satisfy the error condition, it is also necessary to consider a ratio of areas of a minimum bounding rectangle of the point clouds that satisfy the error condition to areas of a minimum bounding rectangle of the spatial submap graph.

Exemplarily, an example is taken where both of the above ratio thresholds are 0.8, if, according to statistics, the ratio of the point clouds in each spatial submap graph that satisfy the error condition is less than or equal to 0.8, or the ratio of the areas of the minimum bounding rectangle of the point clouds that satisfy the error condition to the areas of the minimum bounding rectangle of the spatial submap graph is less than or equal to 0.8, then the point clouds in this spatial submap graph may use large-scale optimization.

In the large-scale optimization, the server may put a relative pose between corresponding points in the point cloud pair, and through the relative pose, a point pair of each point cloud pair in the spatial submap graph may be found with a deep neural network model (Deep VCP).

S506, acquiring a relative pose of each point cloud in each point cloud pair according to the point pair of each point cloud pair in the spatial submap graph and a weight of each point cloud pair.

Similar to the embodiments as shown in FIG. 4, the server may firstly discard a first point cloud pair in the spatial submap graph having a weight less than a first threshold, and then determine a relative pose between point clouds of each point pair in a second point cloud pair other than the first point cloud pair in the spatial submap graph using a generalized iterative closest point algorithm.

Exemplarily, the relative pose of each point cloud can be determined with a formula (2):

$$\sum_{ij \in \Gamma} \sum_{k \in \Phi_{ij}} w_{ij}^l w_{ij}^p \|(R_i p_i^k + t_i) - (R_j p_j^k + t_j)\|_2^2 \quad (2)$$

where $w_{ij}^l$ represents confidence predicted by the deep neural network model upon the point pair, $[R_i, t_i]$, $[R_j, t_j]$ represent global initial poses of the i-th and j-th point clouds respectively, and $p_i^k$, $p_j^k$ represent any point pair k in point pairs of the deep neural network model respectively. $\Gamma$ represents a set of point cloud pairs and $\Phi_{ij}$ represents a set of point pairs constructed in the deep neural network model.

S507, fusing, through a pose graph, the relative pose of each point cloud in each point cloud pair with a global initial pose of each point cloud in each point cloud pair to acquire a global pose of each point cloud in each point cloud pair.

For technical effects, technical features and optional embodiments of S507, reference may be made to contents of S407 shown in FIG. 4, and details will not be described here again.

In the present application, point pairs constructed by a deep neural network module are more accurate, and the number of point pairs can be further reduced to reduce optimization scale.

Figure 6:
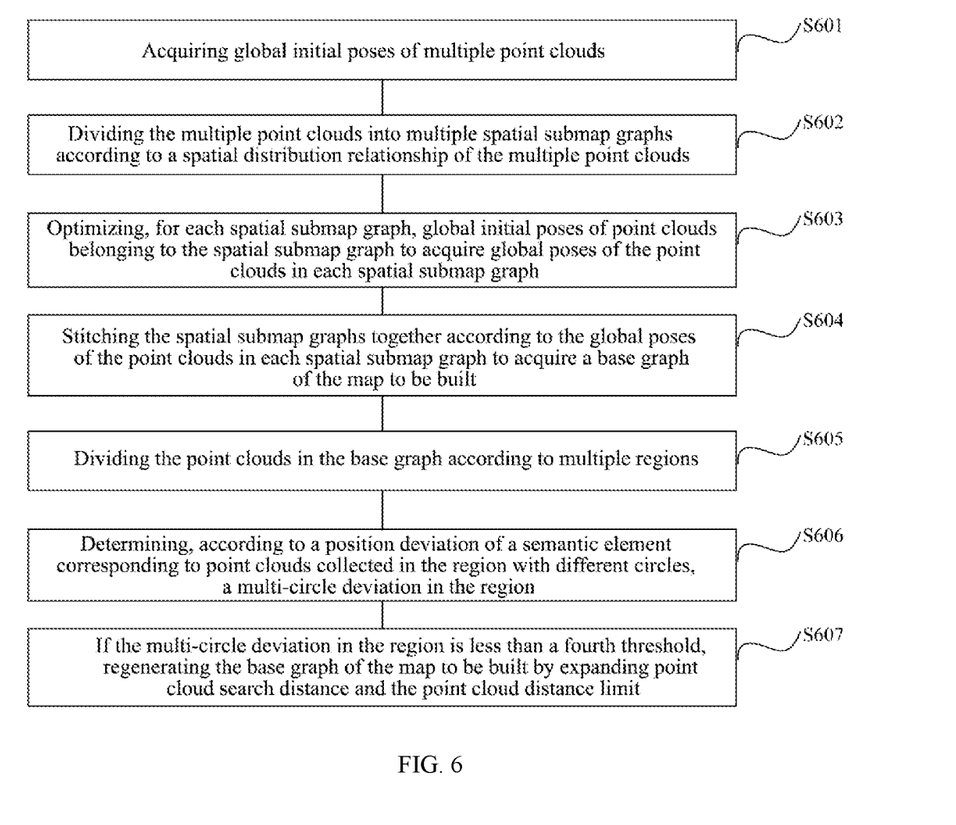
FIG. 6 is yet another flow diagram of a high-precision mapping method according to an embodiment of the present application.

Based on the above embodiments, after the stitching is completed for the base graph of the map to be built, stitching quality of the base graph can also be verified. If the stitching quality is unqualified, the base graph of the map to be built can be regenerated by means of second iteration. FIG. 6 is yet another flow diagram of a high-precision mapping method according to an embodiment of the present application. As shown in FIG. 6, the mapping method includes:

S601, acquiring global initial poses of point clouds, where the point clouds are point clouds of a location for which a map is to be built and are collected by a lidar using a multi-circle collection mode.

S602, dividing the multiple point clouds into multiple spatial submap graphs according to a spatial distribution relationship of the multiple point clouds.

S603, optimizing, for each spatial submap graph, global initial poses of point clouds belonging to the spatial submap graph to acquire global poses of the point clouds in each spatial submap graph.

S604, stitching the spatial submap graphs together according to the global poses of the point clouds in each spatial submap graph to acquire a base graph of the map to be built.

For technical effects, technical features and optional embodiments of S601-S604, reference may be made to contents of S201-S204 shown in FIG. 2, and details will not be described here again.

S605, dividing the point clouds in the base graph according to multiple regions.

In the present application, the acquired base graph of the map to be built contains global poses of all point clouds involved in reconstruction, at this point, stitching quality of the base graph can be verified. Specifically, all point clouds in the base graph may be divided into multiple regions, each of which covers a range approximately like a block or a scenario.

The embodiments of the present application do not limit how to divide a region. Exemplarily, division may be performed according to a preset size or according to buildings on the map.

S606, determining, according to a position deviation of a semantic element corresponding to point clouds collected in the region with different circles, a multi-circle deviation in the region, where the multi-circle deviation in the region is used to characterize stitching quality of the base graph.

The semantic element is not limited in the embodiments of the present invention; exemplarily, it may be a rod, ground, etc.

In the embodiments of the present application, the server may extract semantic elements of different circles in each region, and then determine a multi-circle deviation by estimating a position deviation of a semantic element corresponding to point clouds collected in the same region with different circles, where the multi-circle deviation reflects stitching quality of the map.

S607, if the multi-circle deviation in the region is less than a fourth threshold, regenerating the base graph of the map to be built by expanding point cloud search distance and the point cloud distance limit.

The fourth threshold is not limited in the embodiments of the present application, which may be set according to an actual situation.

In the present application, the server may evaluate stitching quality of different regions in the base graph, and a region for which the multi-circle deviation is less than the fourth threshold will enter a second iterative optimization. At this point, for this region, various different search directions may be selected according to quality variations of optimization results.

Specifically, for the multi-circle deviation, a second iteration may be carried out by expanding the aforementioned point cloud search distance and the point cloud distance limit. In the second iteration, the optimization of the aforementioned point clouds and the stitching process of the base graph are reactivated, and the stitching quality of the map is detected again until the map has qualified stitching quality.

The high-precision mapping method provided in the embodiments of the present application allows for dividing the point clouds in the base graph according to multiple regions; determining, according to a position deviation of a semantic element corresponding to point clouds collected in a region with different circles, a multi-circle deviation in the region; if the multi-circle deviation in the region is less than a fourth threshold, regenerating the base graph of the map to be built by expanding point cloud search distance and the point cloud distance limit. In this way, map stitching optimization and quality detection can be completed per block. According to results of the quality detection, the point cloud search distance and the point cloud distance limit can be further expanded, and data optimization can be completed iteratively to effectively improve a mapping success rate.

Persons of ordinary skill in the art may understand that, all or a part of the steps of the foregoing method embodiments may be implemented by program information related hardware. The foregoing program may be stored in a computer readable storage medium. When the program runs, the steps of the foregoing method embodiments are performed. The foregoing storage medium includes various mediums capable of storing program codes, such as an ROM, an RAM, a magnetic disk, or an optical disc.

Figure 7:
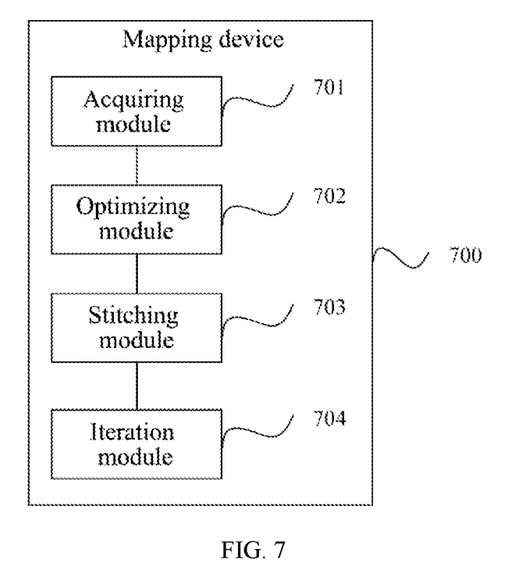
FIG. 7 is a schematic structural diagram of a high-precision mapping device according to an embodiment of the present application.

FIG. 7 is a schematic structural diagram of a high-precision mapping device according to an embodiment of the present application. The high-precision mapping device may be implemented by software, hardware or a combination thereof, which may be, for example, the server described above or a chip in the server for performing the communication method described above. As shown in FIG. 7, the high-precision mapping device 700 includes an acquiring module 701, an optimizing module 702, a stitching module 703, and an iteration module 704.

The acquiring module 701 is configured to acquire global initial poses of multiple point clouds, where the point clouds are point clouds of a location for which a map is to be built and are collected by a lidar using a multi-circle collection mode.

The optimizing module 702 is configured to divide the multiple point clouds into multiple spatial submap graphs according to a spatial distribution relationship of the multiple point clouds, and optimize, for each spatial submap graph, global initial poses of point clouds belonging to the spatial submap graph to acquire global poses of the point clouds in each spatial submap graph.

The stitching module 703 is configured to stitch the multiple spatial submap graphs together according to global poses of the point clouds in each spatial submap graph to acquire a base graph of the map to be built.

In an optional implementation, the acquiring module 701 is specifically configured to: acquire a relative pose between two temporally adjacent point clouds through wheel speed meter data and inertial measurement unit IMU data; acquire at least one temporal submap graph, where each temporal submap graph includes temporally adjacent point clouds; generate a first pose graph according to global positioning system GPS data, the relative pose between the two temporally adjacent point clouds, and the at least one temporal submap graph, where each point cloud is characterized as a node in the first pose graph, and the two adjacent point clouds are characterized as adjacent nodes in the first pose graph; and optimize the first pose graph to acquire the global initial poses of the multiple point clouds.

In an optional implementation, the acquiring module 701 is specifically configured to acquire the global initial poses of the multiple point clouds through global positioning system GPS data and/or inertial measurement unit IMU data.

In an optional implementation, the optimizing module 702 is specifically configured to divide the multiple point clouds into multiple spatial submap graphs according to a spatial distribution relationship of the point clouds in an altitude direction and a spatial distribution relationship of the point clouds in a horizontal direction.

In an optional implementation, the optimizing module 702 is specifically configured to: divide, in the altitude direction, point clouds located on an identical layer into an identical spatial submap graph according to layering of the multiple point clouds in altitude; acquire, in the horizontal direction, an undirected graph of the point clouds according to a trajectory formed from the global initial poses of the multiple point clouds; and cut the undirected graph through a minimum cut algorithm, and divide the point clouds in the undirected graph into the multiple spatial submap graphs.

In an optional implementation, the optimizing module 702 is further configured to form, according to a point cloud distance limit, two point clouds in the spatial submap graph which have a common observation point and for which an absolute value of a difference between global initial poses is less than the distance limit into a point cloud pair, where a weight of the point cloud pair is negatively related to temporal distance between the point clouds contained in the point cloud pair.

In an optional implementation, the optimizing module 702 is specifically configured to: if a ratio of point clouds in the spatial submap graph that satisfy an error condition is greater than a preset ratio threshold, then discard a first point cloud pair in the spatial submap graph having a weight less than a first threshold, where the error condition includes that the number of GPS satellites corresponding to timestamps of the point clouds exceeds a second threshold and a point cloud position error is less than a third threshold; determine a relative pose of each point cloud in a second point cloud pair other than the first point cloud pair in the spatial submap graph using a generalized iterative closest point GICP algorithm; and fuse, through a pose graph, the relative pose of each point cloud in the second point cloud pair with a global initial pose of each point cloud in the second point cloud pair to acquire a global pose of each point cloud in the second point cloud pair.

In an optional implementation, the optimizing module 702 is specifically configured to: if a ratio of point clouds in the spatial submap graph that satisfy an error condition is less than or equal to a preset ratio threshold, then acquire a point pair of each point cloud pair in the spatial submap graph, where the error condition includes that the number of GPS satellites corresponding to timestamps of the point clouds exceeds a second threshold and a point cloud position error is less than a third threshold; acquire a relative pose of each point cloud in each point cloud pair according to the point pair of each point cloud pair in the spatial submap graph and a weight of each point cloud pair; and fuse, through a pose graph, the relative pose of each point cloud in each point cloud pair with a global initial pose of each point cloud in each point cloud pair to acquire a global pose of each point cloud in each point cloud pair.

In an optional implementation, the device further includes:

an iteration module 704, configured to divide the point clouds in the base graph according to at least one region; determine, according to a position deviation of a semantic element corresponding to point clouds collected in the region with different circles, a multi-circle deviation in the region, where the multi-circle deviation in the region is used to characterize stitching quality of the base graph; if the multi-circle deviation in the region is less than a fourth threshold, regenerate the base graph of the map to be built by expanding point cloud search distance and the point cloud distance limit.

The high-precision mapping device provided in the embodiment of the present application can perform an action of the high-precision mapping method in the method embodiments described above. Implementation principles and technical effects therebetween are similar, details for which will not be described here again.

According to an embodiment of the present application, the present application also provides an electronic device and a readable storage medium.

Figure 8:
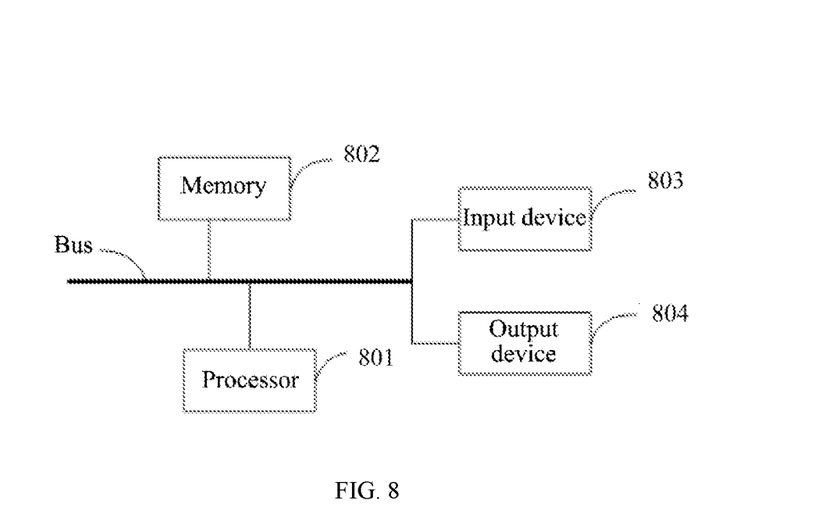
FIG. 8 is a block diagram of an electronic device for a high-precision mapping method according to an embodiment of the present application.

As shown in FIG. 8, FIG. 8 is a block diagram of an electronic device for a high-precision mapping method according to an embodiment of the present application. The electronic device is intended to represent various forms of digital computers, such as a laptop computer, a desktop computer, a workbench, a personal digital assistant, a server, a blade server, a mainframe computer, and other suitable computers. The electronic device may also represent various forms of mobile devices, such as a personal digital assistant, a cellular phone, a smart phone, a wearable device, and other similar computing devices. The components shown herein, their connections and relationships, and their functions are merely examples, and are not intended to limit implementations of the present application described and/or claimed herein.

As shown in FIG. 8, the electronic device includes: one or more processors 801, a memory 802, and interfaces for connecting the component, including high-speed interfaces and low-speed interfaces. The components are connected to each other via different buses, and can be installed on a public motherboard or installed in other ways as desired. The processor may process instructions executed within the electronic device, including instructions that stored in or on the memory to display GUI graphical information on an external input/output device (such as a display device coupled to the interface). In other embodiments, multiple processors and/or multiple buses can be used together with multiple memories, if desired. Similarly, multiple electronic devices can be connected, and each device provides some necessary operations (for example, as a server array, a group of blade servers, or a multi-processor system). In FIG. 8, one processor 801 is used as an example.

The memory 802 is a non-transitory computer readable storage medium provided in the present application. The memory is stored with instructions executable by at least one processor, enabling at least one processor to execute mapping method provided in the present application. The non-transitory computer readable storage medium of the present application is stored with computer instructions, which are configured to enable a computer to execute the mapping method provided in the present application.

As a kind of non-transitory computer readable storage medium, the memory 802 may be configured to store non-transitory software programs, non-transitory computer executable programs and modules, such as program instructions/modules corresponding to the mapping method in the embodiments of the present application (for example, the acquiring module 701, the optimizing module 702, the stitching module 703 and the iteration module 704 shown in FIG. 7). The processor 801 executes various functional applications and data processing of the server by running the non-transitory software programs, instructions, and modules stored in the memory 802, thereby implementing the mapping method in the foregoing method embodiments.

The memory 802 may include a program storage area and a data storage area, where the program storage area may be stored with an operating system and an application program required by at least one function, the data storage area may be stored with data created according to use of electronic device for a high-precision mapping method, and the like. In addition, the memory 802 may include a high-speed random access memory, and may also include a non-transitory memory, such as at least one magnetic disk storage device, a flash memory device, or other non-transitory solid-state storage devices. In some embodiments, the memory 802 optionally includes remote memories arranged relative to the processor 801, and these remote memories can be connected to the electronic device for a high-precision mapping method through a network. Examples of the above network include, but are not limited to, Internet, an intranet, a local area network, a mobile communication network, and a combination thereof.

The electronic device for the mapping method may also include: an input device 803 and an output device 804. The processor 801, the memory 802, the input device 803 and the output device 804 can be connected by a bus or in other ways, in FIG. 8, connections via buses are used as an example.

The input device 803 may receive input digital or character information, and generate key signal input related to user settings and function control of the electronic device for a high-precision mapping method, such as a touch screen, a keypad, a mouse, a trackpad, a touchpad, an indicator bar, one or more mouse buttons, a trackball, a joystick and other input devices. The output device 804 may include a display device, an auxiliary lighting device (e. g., an LED), a tactile feedback device (e. g., a vibration motor), and the like. The display device may include, but is not limited to, a liquid crystal display (LCD), a light emitting diode (LED) display, and a plasma display. In some implementations, the display device may be the touch screen.

Various implementations of the system and the technique described here may be implemented in a digital electronic circuit system, an integrated circuit system, an ASIC (application specific integrated circuit), computer hardware, firmware, software, and/or a combination thereof. These various implementations may include: implementations implemented in one or more computer programs, where the one or more computer programs may be executed and/or interpreted on a programmable system including at least one programmable processor, and the programmable processor may be a dedicated or generic programmable processor, which may receive data and instructions from a storage system, at least one input device and at least one output device, and transmit the data and the instructions to the storage system, the at least one input device and the at least one output device.

These computing programs (also known as programs, software, software applications, or codes) include machine instructions of the programmable processor, and may be implemented using a high-level process and/or an object-oriented programming language, and/or an assembly/machine language. As used herein, the terms such as "machine readable medium" and "computer readable medium" refer to any computer program product, device, and/or equipment (e.g., a magnetic disk, an optical disk, a memory, a programmable logic device (PLD)) configured to provide machine instructions and/or data to the programmable processor, including a machine readable medium that receives machine instructions as machine readable signals. The term "machine readable signal" refers to any signal configured to provide machine instructions and/or data to the programmable processor.

For provision of interaction with a user, the system and the technique described herein may be implemented on a computer, and the computer has: a display device for displaying information to the user (such as a CRT (cathode ray tube) or an LCD (liquid crystal display) monitor); and a keyboard and a pointing device (such as a mouse or a trackball), the user may provide an input to the computer through the keyboard and the pointing device. Other kinds of devices may also be used to provide the interaction with the user; for example, feedback provided to the user may be any form of sensor feedback (e.g., visual feedback, auditory feedback, or tactile feedback); and may receive the input from the user in any form (including an acoustic input, a voice input, or a tactile input).

The system and the technique described herein may be implemented in a computing system that includes back-end components (for example, as a data server), or a computing system that includes intermediate components (for example, an application server), or a computing system that includes front-end components (for example, a user computer with a graphical user interface or a web browser through which the user may interact with the implementations of the systems and the techniques described herein), or a computing system that includes any combination of the back-end components, the intermediate components, or the front-end components. The components of the system may be interconnected by any form or medium of digital data communications (e.g., a communication network). Examples of the communication network include: a local area network (LAN), a wide area network (WAN), and Internet.

The computing computer system may include a client and a server. The client and the server are generally far away from each other, and generally interact with each other through the communication network. A relationship between the client and the server is generated by computer programs running on a corresponding computer and having a client-server relationship.

The technical solutions in the embodiments of the present application allow for: acquiring global initial poses of multiple point clouds, where the point clouds are point clouds of a location for which a map is to be built and are collected by a lidar using a multi-circle collection mode; dividing the multiple point clouds into multiple spatial submap graphs according to a spatial distribution relationship of the multiple point clouds; optimizing, for each spatial submap graph, global initial poses of point clouds belonging to the spatial submap graph to acquire global poses of the point clouds in each spatial submap graph; and stitching the multiple spatial submap graphs together according to global poses of the point clouds in the multiple spatial submap graphs to acquire a base graph of the map to be built. Compared with the prior art, in the present application, multiple frames of point clouds are divided into multiple spatial submap graphs and, for each spatial submap graph, global initial poses of point clouds belonging to the spatial submap graph are optimized so that the amount of computations in the optimization process is reduced, stitching efficiency of the point clouds can be improved, and mapping optimization is accomplished quickly.

It should be understood that the various forms of processes shown above can be used, and reordering, addition, or deletion of a step can be performed. For example, the steps recorded in the present application can be executed concurrently, sequentially, or in different orders, provided that desirable results of the technical solutions disclosed in the present application could be achieved, and there is no limitation herein.

The above specific embodiments do not constitute a limitation on the protection scope of the present application. Those skilled in the art should understand that various modifications, combinations, sub-combinations, and replacements can be made according to design requirements and other factors. Any modification, equivalent replacement and improvement made within the spirit and principle of the present application shall be included in the protection scope of the present application.

What is claimed is:

1. A high-precision mapping method, comprising:
    acquiring global initial poses of multiple point clouds, wherein the point clouds are point clouds of a location for which a map is to be built and are collected by a lidar using a multi-circle collection mode;
    dividing the multiple point clouds into multiple spatial submap graphs according to a spatial distribution relationship of the multiple point clouds;
    optimizing, for each spatial submap graph, global initial poses of point clouds belonging to the spatial submap graph to acquire global poses of the point clouds in each spatial submap graph; and
    stitching the multiple spatial submap graphs together according to global poses of the point clouds in each spatial submap graph to acquire a base graph of the map to be built;
    wherein before the optimizing, for each spatial submap graph, global initial poses of point clouds belonging to the spatial submap graph to acquire global poses of the point clouds in each spatial submap graph, the method further comprises:
    forming, according to a point cloud distance limit, two point clouds in the spatial submap graph which have a common observation point and for which an absolute value of a difference between global initial poses is less than the distance limit into a point cloud pair, wherein a weight of the point cloud pair is negatively related to temporal distance between the point clouds contained in the point cloud pair.

2. The method according to claim 1, wherein the acquiring global initial poses of multiple point clouds comprises:
    acquiring a relative pose between two temporally adjacent point clouds through wheel speed meter data and inertial measurement unit (IMU) data;

acquiring at least one temporal submap graph, wherein each temporal submap graph comprises temporally adjacent point clouds;

generating a first pose graph according to global positioning system (GPS) data, the relative pose between the two temporally adjacent point clouds, and the at least one temporal submap graph, wherein each point cloud is characterized as a node in the first pose graph, and the two adjacent point clouds are characterized as adjacent nodes in the first pose graph; and optimizing the first pose graph to acquire the global initial poses of the multiple point clouds.

3. The method according to claim 1, wherein the acquiring global initial poses of multiple point clouds comprises:
acquiring the global initial poses of the multiple point clouds through at least one of GPS data or IMU data.

4. The method according to claim 1, wherein the dividing the multiple point clouds into multiple spatial submap graphs comprises:
dividing the multiple point clouds into multiple spatial submap graphs according to a spatial distribution relationship of the point clouds in an altitude direction and a spatial distribution relationship of the point clouds in a horizontal direction.

5. The method according to claim 4, wherein the dividing the multiple point clouds into multiple spatial submap graphs according to a spatial distribution relationship of the point clouds in an altitude direction and a spatial distribution relationship of the point clouds in a horizontal direction comprises:
dividing, in the altitude direction, point clouds located on an identical layer into an identical spatial submap graph according to layering of the multiple point clouds in altitude;
acquiring, in the horizontal direction, an undirected graph of the point clouds according to a trajectory formed from the global initial poses of the multiple point clouds; and
cutting the undirected graph through a minimum cut algorithm, and dividing the point clouds in the undirected graph into the multiple spatial submap graphs.

6. The method according to claim 1, wherein the optimizing, for each spatial submap graph, global initial poses of point clouds belonging to the spatial submap graph to acquire global poses of the point clouds in each spatial submap graph comprises:
if a ratio of point clouds in the spatial submap graph that satisfy an error condition is greater than a preset ratio threshold, then discarding a first point cloud pair in the spatial submap graph having a weight less than a first threshold, wherein the error condition comprises that the number of GPS satellites corresponding to timestamps of the point clouds exceeds a second threshold and a point cloud position error is less than a third threshold;
determining a relative pose of each point cloud in a second point cloud pair other than the first point cloud pair in the spatial submap graph using a generalized iterative closest point (GICP) algorithm; and
fusing, through a pose graph, the relative pose of each point cloud in the second point cloud pair with a global initial pose of each point cloud in the second point cloud pair to acquire a global pose of each point cloud in the second point cloud pair.

7. The method according to claim 1, wherein the optimizing, for each spatial submap graph, global initial poses of point clouds belonging to the spatial submap graph to acquire global poses of the point clouds in each spatial submap graph comprises:
if a ratio of point clouds in the spatial submap graph that satisfy an error condition is less than or equal to a preset ratio threshold, then acquiring a point pair of each point cloud pair in the spatial submap graph, wherein the error condition comprises that the number of GPS satellites corresponding to timestamps of the point clouds exceeds a second threshold and a point cloud position error is less than a third threshold;
acquiring a relative pose of each point cloud in each point cloud pair according to the point pair of each point cloud pair in the spatial submap graph and a weight of each point cloud pair; and
fusing, through a pose graph, the relative pose of each point cloud in each point cloud pair with a global initial pose of each point cloud in each point cloud pair to acquire a global pose of each point cloud in each point cloud pair.

8. The method according to claim 1, wherein after the base graph of the map to be built is acquired, further comprising:
dividing the point clouds in the base graph according to at least one region;
determining, according to a position deviation of a semantic element corresponding to point clouds collected in the region with different circles, a multi-circle deviation in the region, wherein the multi-circle deviation in the region is used to characterize stitching quality of the base graph;
if the multi-circle deviation in the region is less than a fourth threshold, regenerating the base graph of the map to be built by expanding point cloud search distance and the point cloud distance limit.

9. A mapping device, comprising:
at least one processor; and
a memory in communication with the at least one processor,
wherein the memory is stored with instructions executable by the at least one processor, and the instructions are executed by the at least one processor to enable the at least one processor to:
acquire global initial poses of multiple point clouds, wherein the point clouds are point clouds of a location for which a map is to be built and are collected by a lidar using a multi-circle collection mode;
divide the multiple point clouds into multiple spatial submap graphs according to a spatial distribution relationship of the multiple point clouds, and optimize, for each spatial submap graph, global initial poses of point clouds belonging to the spatial submap graph to acquire global poses of the point clouds in each spatial submap graph; and
stitch the multiple spatial submap graphs together according to global poses of the point clouds in each spatial submap graph to acquire a base graph of the map to be built;
wherein the at least one processor is further enabled to form, according to a point cloud distance limit, two point clouds in the spatial submap graph which have a common observation point and for which an absolute value of a difference between global initial poses is less than the distance limit into a point cloud pair, wherein a weight of the point cloud pair is negatively related to temporal distance between the point clouds contained in the point cloud pair.

10. The device according to claim 9, wherein the at least one processor is further enabled to: acquire a relative pose between two temporally adjacent point clouds through wheel speed meter data and inertial measurement unit (IMU) data; acquire at least one temporal submap graph, wherein each temporal submap graph comprises temporally adjacent point clouds; generate a first pose graph according to global positioning system (GPS) data, the relative pose between two temporally adjacent point clouds, and the at least one temporal submap graph, wherein each point cloud is characterized as a node in the first pose graph, and the two adjacent point clouds are characterized as adjacent nodes in the first pose graph; and optimize the first pose graph to acquire the global initial poses of the multiple point clouds.

11. The device according to claim 9, wherein the at least one processor is further enabled to acquire the global initial poses of the multiple point clouds through at least one of GPS data or IMU data.

12. The device according to claim 9, wherein the at least one processor is further enabled to divide the multiple point clouds into multiple spatial submap graphs according to a spatial distribution relationship of the point clouds in an altitude direction and a spatial distribution relationship of the point clouds in a horizontal direction.

13. The device according to claim 12, wherein the at least one processor is further enabled to: divide, in the altitude direction, point clouds located on an identical layer into an identical spatial submap graph according to layering of the multiple point clouds in altitude; acquire, in the horizontal direction, an undirected graph of the point clouds according to a trajectory formed from the global initial poses of the multiple point clouds; and cut the undirected graph through a minimum cut algorithm, and divide the point clouds in the undirected graph into the multiple spatial submap graphs.

14. The device according to claim 9, wherein the at least one processor is further enabled to: if a ratio of point clouds in the spatial submap graph that satisfy an error condition is greater than a preset ratio threshold, then discard a first point cloud pair in the spatial submap graph having a weight less than a first threshold, wherein the error condition comprises that the number of GPS satellites corresponding to timestamps of the point clouds exceeds a second threshold and a point cloud position error is less than a third threshold; determine a relative pose of each point cloud in a second point cloud pair other than the first point cloud pair in the spatial submap graph using a generalized iterative closest point (GICP) algorithm; and fuse, through a pose graph, the relative pose of each point cloud in the second point cloud pair with a global initial pose of each point cloud in the second point cloud pair to acquire a global pose of each point cloud in the second point cloud pair.

15. The device according to claim 9, wherein the at least one processor is further enabled to: if a ratio of point clouds in the spatial submap graph that satisfy an error condition is less than or equal to a preset ratio threshold, then acquire a point pair of each point cloud pair in the spatial submap graph, wherein the error condition comprises that the number of GPS satellites corresponding to timestamps of the point clouds exceeds a second threshold and a point cloud position error is less than a third threshold; acquire a relative pose of each point cloud in each point cloud pair according to the point pair of each point cloud pair in the spatial submap graph and a weight of each point cloud pair; and fuse, through a pose graph, the relative pose of each point cloud in each point cloud pair with a global initial pose of each point cloud in each point cloud pair to acquire a global pose of each point cloud in each point cloud pair.

16. The device according to claim 10, wherein the at least one processor is further enabled to divide the point clouds in the base graph according to at least one region; determine, according to a position deviation of a semantic element corresponding to point clouds collected in the region with different circles, a multi-circle deviation in the region, wherein the multi-circle deviation in the region is used to characterize stitching quality of the base graph; if the multi-circle deviation in the region is less than a fourth threshold, regenerate the base graph of the map to be built by expanding point cloud search distance and the point cloud distance limit.

17. A non-transient computer readable storage medium stored with computer instructions, wherein the computer instructions are configured to enable the computer to implement the following steps:
    acquiring global initial poses of multiple point clouds, wherein the point clouds are point clouds of a location for which a map is to be built and are collected by a lidar using a multi-circle collection mode;
    dividing the multiple point clouds into multiple spatial submap graphs according to a spatial distribution relationship of the multiple point clouds;
    optimizing, for each spatial submap graph, global initial poses of point clouds belonging to the spatial submap graph to acquire global poses of the point clouds in each spatial submap graph; and
    stitching the multiple spatial submap graphs together according to global poses of the point clouds in each spatial submap graph to acquire a base graph of the map to be built;
    wherein before the computer instructions are configured to enable the computer to implement the step of the optimizing, for each spatial submap graph, global initial poses of point clouds belonging to the spatial submap graph to acquire global poses of the point clouds in each spatial submap graph, the computer instructions are configured to enable the computer to implement the following step:
    forming, according to a point cloud distance limit, two point clouds in the spatial submap graph which have a common observation point and for which an absolute value of a difference between global initial poses is less than the distance limit into a point cloud pair, wherein a weight of the point cloud pair is negatively related to temporal distance between the point clouds contained in the point cloud pair.

18. The non-transient computer readable storage medium according to claim 17, wherein the computer instructions are configured to enable the computer to implement the following steps:
    acquiring a relative pose between two temporally adjacent point clouds through wheel speed meter data and inertial measurement unit (IMU) data;
    acquiring at least one temporal submap graph, wherein each temporal submap graph comprises temporally adjacent point clouds;
    generating a first pose graph according to global positioning system (GPS) data, the relative pose between the two temporally adjacent point clouds, and the at least one temporal submap graph, wherein each point cloud is characterized as a node in the first pose graph, and the two adjacent point clouds are characterized as adjacent nodes in the first pose graph; and optimizing the first pose graph to acquire the global initial poses of the multiple point clouds.

\* \* \* \* \*